Sept. 24, 1963 M. FERRIS 3,104,881
RECORDING TECHNIQUES
Filed Aug. 12, 1960
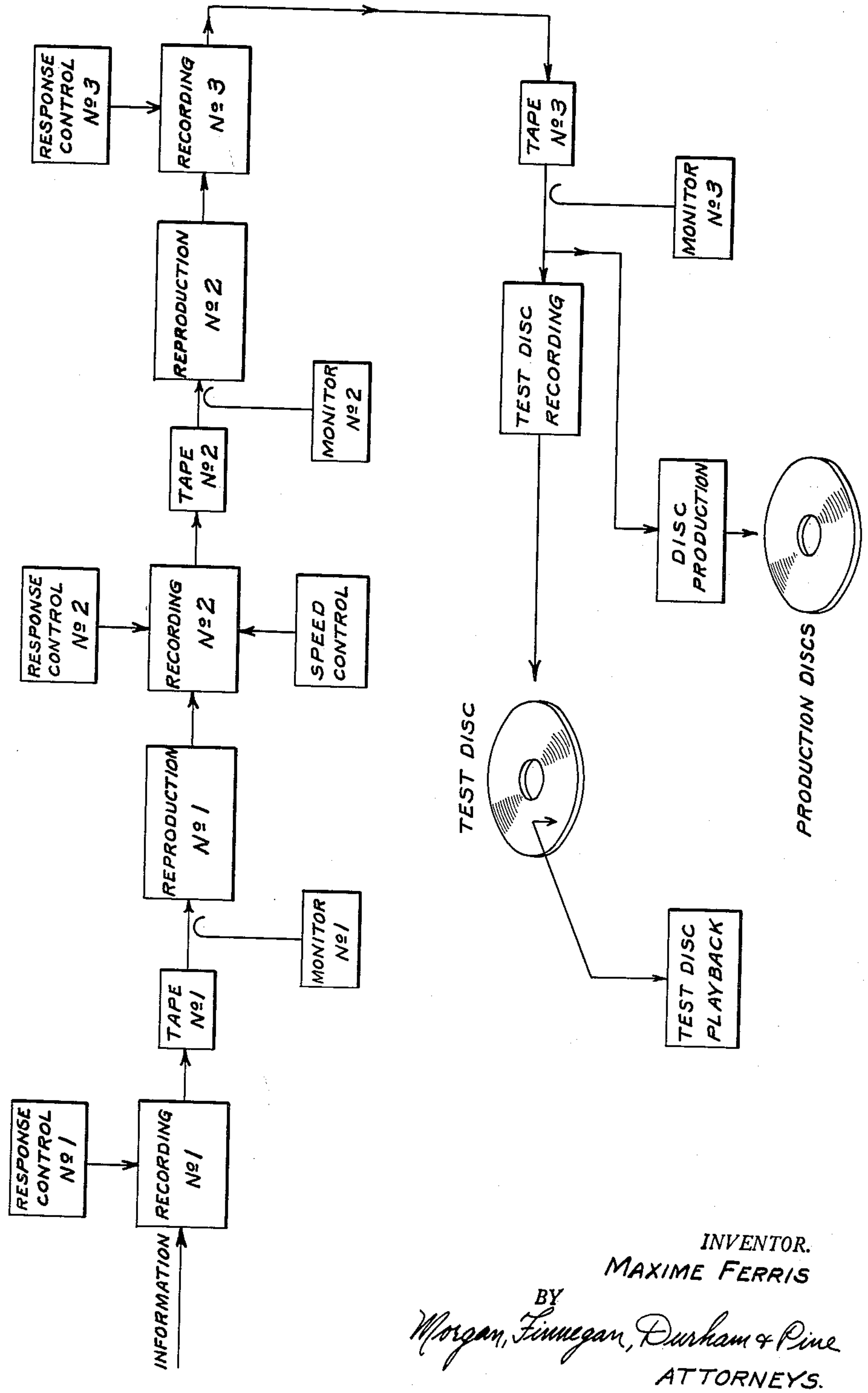
INVENTOR.
MAXIME FERRIS
BY
Morgan, Finnegan, Durham & Pine
ATTORNEYS.

3,104,881

RECORDING TECHNIQUES

Maxime Ferris, Jackson Heights, N.Y., assignor to Linguadisc Corporation, New York, N.Y., a body corporate of New York Filed Aug. 12, 1960, Ser. No. 49,221
7 Claims. (Cl. 274—46)

This invention relates to records and recording techniques and more particularly to a record and method of recording information on said record in such a manner as to permit a reproduction of the information at a plurality of rates.

Recording techniques as presently practiced depend largely on the nature of the data to be recorded and on the intended use thereof. The form in which the data are represented also governs the appropriateness of any particular technique. Thus, methods involving magnetic tape and punched cards are frequently employed where the data essentially comprise discrete bi-valued bits such as digital information. In these cases the reproduction of the data from a record medium such as punched cards or tape can be readily carried out at a plurality of speeds without distorting the information, it only being necessary to adapt the apparatus which displays the reproduced information to the selected reproducing speed. Accordingly, in the case of punched card, or magnetic tape processes, the cards may be scanned or the tape magnetically "read" at any desired rate provided the machine which presents the data in visual form, e.g., a printer or cathode ray tube, is capable of responding to the selected read-out speed.

However, in the recording of speech and music, hereinafter referred to as "complex information" or "complex data," the flexibility noted above is absent. Such complex data is not readily represented as an aggregation of bits of bi-valued nature but is rather represented by complex, continuously variable parameters. An electrical representation of speech or music has, for example, a complex waveform which is not readily characterized, even by the use of rigorous mathematical techniques. A Fourier expression which characterizes the comblex information in terms of an aggregate of harmonic transcendental functions is largely used and is admittedly accurate only for specified waveforms which do not occur in practice.

In view of its variable and vaguely-defined character, complex information is generally recorded on an analog basis which employs, for example, a direct analogy between the time variant amplitude of the data and a time variant amplitude in an analogous quantity of, say, the groove in a disc record.

When recorded in this form it is a matter of common knowledge and observation that the reproduction rate must be confined to substantially one value, that is to say, the reproduction rate must have a value which conforms with the intrinsic delivery rate normally characterizing the communication of the intelligence in question. The effect of a departure from this required rate may be readily observed by playing a 33⅓ r.p.m. record at 45 r.p.m. or vice versa. In the first case a treble and shrill chatter somewhat akin to the screech of certain birds is heard while in the latter a deep, drawn out and unnatural bass characteristic occurs in which even a soprano is heard as a lethargic basso profondo.

It is an object of the invention to overcome the aforementioned limitations inherently involved in the recording of complex information to the end that a plurality of reproducing speeds may be employed for providing a plurality of delivery rates. Such a plurality is useful where it is desired for example to employ records for language instruction. In this application a record, processed according to the invention, is played on the usual multi-speed phonograph, first at a low speed during which the words, phrases and sentences can be heard at reduced delivery rates adapted to ameliorate the initial difficulties attending the learning of a foreign language and then at a higher rate which yields a delivery rate conforming to the normal speech delivery of the language in question. In an exemplary embodiment, such a record may be played at 33⅓ r.p.m. for initial instruction and then at 45 r.p.m. for advanced instruction. There is no discernible distortion at either speed and this fact makes the technique especially useful in language instruction records where discernible distortion is not tolerable. The technique of the invention is adapted to records in general including those for entertainment as well as instruction.

It is accordingly another and more specific object of the invention to provide a record and recording process or technique for the same, said record being adapted to be played at a plurality of speeds without introducing discernible distortion in the reproduced complex information.

A still further object of the invention is to provide a method of recording speech or music, and a record produced thereby, in such a manner that the record may be operated at two substantially different speeds without introducing significant distortion.

Another object of the invention is to provide an instruction record and process for producing the same, whereby the record is adapted to be operated without significant distortion at a plurality of substantially different speeds.

A further and more specific object is to provide a disc record and process therefor wherein the record is capable of being "played" without distortion at a plurality of substantially different speeds including 33⅓ r.p.m. and 45 r.p.m.

Since present records are confined to operation at one speed, records according to the invention also have marked utility in being adapted to be operated at either one of several speeds aside from any requirement for being played at a plurality of speeds. Thus, any record, for example, a musical record for entertainment, can be produced according to the invention and can be employed both by users who have, say, 45 r.p.m. phonographs and by users with 33⅓ r.p.m. phonographs. It is accordingly an object of the invention to provide such a record and a recording process therefor.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally, the process according to the invention comprises a first recording of the information on a record medium, preferably tape. Thereafter the record is transferred to a second record, again preferably tape, with the speed of the transfer process being adjusted according to certain factors and the frequency-amplitude characteristics of the information also being adjusted. Thereafter a second transfer is effected to a third record, also preferably tape, in which frequency-amplitude characteristics are again adjusted in accordance with a number of factors including some associated with peculiarities inherent in the entire record and reproducing system of disc records. This latter step is repeated and adjustments varied in accordance with results obtained by monitoring of this phase of the process. Besides being used for monitoring, the third tape is used in a conventional manner, e.g., to produce the "master lacquer" from which "mothers" and thence "stampers" are made. The "stampers" produced by the "mothers" are employed to press the actual phonograph record. Alternatively, tapes for actual use by the consumer may be developed from the above-mentioned third tape.

In the case of disc records produced according to the invention, the resultant groove pattern does not conform to the normal analog of the speech or music pattern as found in conventional records but is rather related to the speech or music pattern according to a unique relationship which is dependent upon the characteristics of the process.

The invention consists in the novel parts, methods, processes and steps herein shown and described.

Serving as graphic or symbolic representation of an exemplary process of the invention and a record produced thereby is the accompanying drawing.

The process according to the invention will be described in terms of the production of a language instruction record adapted to be played at speeds of 33⅓ r.p.m. and 45 r.p.m.

The process is initiated by a first recording of the language lesson delivered by an instructor, on a first tape. In addition to having the usual vocal and oratorical attributes which characterize a linguist, it is preferred that a voice of feminine quality be used or at least a male voice with a range favoring the high frequency end of the vocal spectrum, e.g., a tenor. It should not be so high as to be falsetto, however.

In the particular case of language records and records of comparable function it is generally desirable that the speech be delivered at a rate somewhat less than normal, e.g., 85% of the normal rate. This reduction will vary according to the nature of the recorded voice and material and may be optimized on an empirical basis.

The recording apparatus may be of conventional configuration such as a standard studio tape recorder and is adjusted in accordance with the usual techniques whereby recording level, bass turnover and treble roll off are set as dictated by the response of the equipment and the nature (e.g., timbre, calibre and resonance) of the voice being recorded. This is symbolized in the drawing by the element labelled, "Response Control No. 1," which is operative in connection with Recording No. 1.

While tape No. 1 is being "cut," a monitoring of the record may be carried out in the usual fashion as symbolically illustrated in the drawing.

After the first tape has been prepared, a second recording on a tape No. 2 is undertaken. In this step, the standard recording speed is departed from so a recorder with adjustable speed characteristics is employed, and specifically one that can operate at speeds higher than normal. In a typical case, the recording speed is increased within a range of about 15% above the standard speed. In addition, the frequency response of the records is varied from the normal characteristic, as symbolized by the element "Response Control No. 2," by boosting the treble end and attenuating the bass end of the spectrum. The precise amount of boost and attenuation depends again on the nature of the voice being recorded and on the nature of the recorded material. In one particular case, treble above 3 kc.s. might be boosted at a rate of 6 to 12 db per octave and bass below 500 c.p.s. attenuated by the same degree. These values are of course given by way of example only and can vary considerably from one recording to another. In general, however, treble is boosted and bass attenuated. Monitoring during this operation may also be conveniently employed as suggested in the drawing.

After recording on tape No. 2, a third recording on a tape No. 3, at standard speed, is performed. As indicated by the drawing, response characteristics are again varied, generally by an additional treble boost and bass attenuation. The exact amount of this response variation may be determined by monitoring a test record subsequently produced as described below.

The output of tape No. 3 is used in a disc recording process to make a test disc, commonly called an "instantaneous acetate" recording. This record is cut at 45 r.p.m. and its performance is checked by a playback thereof. If performance at both 45 r.p.m. and 33⅓ r.p.m. is satisfactory, i.e., is clear and distortion-free, then another disc, the "master" is processed in the conventional manner. From the master, "mothers" are produced which in turn produce "stampers." If, however, performance is not satisfactory then readjustments of the third recording response controls, and perhaps the response associated with the first and second recordings, are made and the new test record evaluated. In some instances this must be iterated before a satisfactory record is produced.

The process above described is capable of variation in accordance with equipment availability. Accordingly, record media other than tapes and discs may be employed which will produce a concomitant change in the process. Moreover, the process also includes additional details relating to the adjustment of equalizers, the employment of studios and studio equipment, the use of compensators and the like, and other details relating to operations of the recorders and cutters which have not been specified herein since they are well known to the art.

Records produced according to the above process have the novel function of being able to deliver the complex information recorded thereon at a plurality of rates without introducing significant distortion. This novel characteristic is imparted as a result of the recording steps described above and is reflected in the characteristics of the variable, e.g., groove amplitude, of the record, which variable represents the successive values of the recorded complex data. The frequency-amplitude (or frequency-velocity) characteristic of the record, that is, its so-called frequency response, differs from the conventional record in that it is adapted to be reproduced at a plurality of rates. Generally speaking, the record, referenced to its higher speed, has a response characteristic marked by an above-normal component of the treble region and a below-normal component of bass. These characteristics do not impair its operability at the higher speed, however, and moreover are effective in eliminating the distortion which would otherwise occur when "playing" the record at a lower speed.

The invention in its broader aspects is not limited to the specific mechanisms shown and described but departures may be made therefrom within the scope of the accompanying claims without departing from the principles of the invention and without sacrificing its chief advantages.

What is claimed is:

1. A process of recording data representing complex information occurring at a predetermined rate in a form adapted to be reproduced at a plurality of rates comprising the steps of recording said data a plurality of times, at least one of said recordings being at a rate different from said predetermined rate and re-recording said data on a permanent record.

2. A process according to claim 1, in which at least one of said recording rates is higher than said predetermined rate.

3. A process according to claim 1, in which said data is also modified by increasing the high-frequency components and decreasing the low-frequency components thereof in excess of the normal equalizer adjustments associated with the said recording.

4. A process according to claim 1, in which said re-recording is carried out at a speed substantially corresponding to the rated speed of said permanent record.

5. A process according to claim 1, in which said data is pre-recorded prior to said recording at a rate less than the normal delivery rate associated with said data.

6. A data storing and reproducing record adapted to reproduce without significant distortion said data at a plurality of rates, said record being produced according to the process of claim 1.

7. A data storing and reproducing record adapted to reproduce without significant distortion said data at a plurality of rates, said record being produced according to the process of claim 5.

References Cited in the file of this patent

UNITED STATES PATENTS

| | | |
|---|---|---|
| 1,719,339 | Reddie | July 2, 1929 |
| 2,352,023 | Schuller | June 20, 1944 |
| 2,396,409 | Berzer | Mar. 12, 1946 |
| 2,539,837 | Howell | Jan. 30, 1951 |
| 2,875,436 | Hammond | Feb. 21, 1959 |
| 2,903,521 | Ellison | Sept. 8, 1959 |